United States Patent
Kumar et al.

(10) Patent No.: US 11,019,143 B2
(45) Date of Patent: *May 25, 2021

(54) ADAPTIVE GOSSIP PROTOCOL

(71) Applicant: Cisco Technology, Inc., San Jose, CA (US)

(72) Inventors: Abhishek Kumar, Vancouver (CA); Harmanpreet Singh, San Jose, CA (US); Kamalkrishna Rameshan, San Jose, CA (US); Moiz Raja, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/443,627

(22) Filed: Jun. 17, 2019

(65) Prior Publication Data
US 2019/0306238 A1 Oct. 3, 2019

Related U.S. Application Data (63) Continuation of application No. 14/805,078, filed on Jul. 21, 2015, now Pat. No. 10,362,106.

(51) Int. Cl.
*H04L 29/08* (2006.01)
*H04L 12/58* (2006.01)
(Continued)

(52) U.S. Cl.
CPC .......... *H04L 67/1095* (2013.01); *H04L 51/14* (2013.01); *H04L 51/32* (2013.01);
(Continued)

(58) Field of Classification Search
CPC ..... H04L 67/104; H04L 67/327; H04L 67/40; H04L 51/14; H04L 65/105; H04L 69/28;
(Continued)

(56) References Cited

U.S. PATENT DOCUMENTS 10,305,721 B1 * 5/2019 Binns .................... H04L 65/105
10,362,106 B2 * 7/2019 Kumar .................... H04L 51/14
(Continued)

OTHER PUBLICATIONS

Cuenca-Acuna et al., "PlanetP: using gossiping to build content addressable peer-to-peer information sharing communities". In Proc . 12th Intl. Symp. on High Performance Distributed Computing, pp. 236-246. IEEE (Year: 2003).*

(Continued)

*Primary Examiner* — Jungwon Chang
(74) *Attorney, Agent, or Firm* — Polsinelli PC (57) ABSTRACT

Systems, methods, and computer-readable media for an adaptive gossip protocol. A node in a cluster can detect a gossip protocol synchronization triggering event which can include an indication that the node has received data from a second node via a gossip protocol, an update to data maintained by nodes in the cluster, and/or an operation. In response to the triggering event, the node can determine a dynamic gossip interval for disseminating data from the node to other nodes via a gossip protocol, the dynamic gossip interval being based on a synchronization state associated with the cluster and/or one or more gossip protocol events associated with the cluster. Next, the node can select a third node in the cluster for disseminating the data from the node to the third node. The node can then transmit the data to the third node via the gossip protocol based on the dynamic gossip interval.

20 Claims, 9 Drawing Sheets

(51) Int. Cl.
*H04L 29/06* (2006.01)
*H04L 12/761* (2013.01)
*H04L 12/751* (2013.01)
*H04L 12/701* (2013.01)

(52) U.S. Cl.
CPC ............ H04L 67/104 (2013.01); H04L 69/28 (2013.01); *H04L 45/00* (2013.01); *H04L 45/02* (2013.01); *H04L 45/16* (2013.01); *H04L 63/0272* (2013.01); *H04L 67/327* (2013.01); *H04L 67/40* (2013.01)

(58) Field of Classification Search
CPC ..... H04L 45/16; H04L 45/02; H04L 67/1095; H04L 51/32; H04L 45/00; H04L 63/0272
See application file for complete search history.

(56) References Cited

U.S. PATENT DOCUMENTS

| | | |
|---|---|---|
| 2003/0126191 A1 | 7/2003 | Hofner et al. |
| 2007/0110063 A1* | 5/2007 | Tang ................. H04L 45/02 370/390 |
| 2009/0323669 A1 | 12/2009 | Salonidis et al. |
| 2012/0143957 A1* | 6/2012 | Ganapathy ............ H04L 43/10 709/205 |
| 2013/0094536 A1 | 4/2013 | Hui et al. |
| 2014/0016510 A1 | 1/2014 | Clemm et al. |
| 2014/0074987 A1 | 3/2014 | Martz et al. |
| 2015/0347627 A1 | 12/2015 | Brueckner |

OTHER PUBLICATIONS

Levy et al., "Overhead of a Decentralized Gossip Algorithm on the Performance of HPC Applications", Department of Computer Science (Year: 2014).*

Kyasanur, Pradeep et al., "Smart Gossip: Infusing Adaptivity into Gossiping Protocols for Sensor Networks," Technical Report, Department of Computer Science, University of Illinois at Urbana—Champaign, 2006.

Verma, Satish et al., "Controlling Gossip Protocol Infection Pattern Using Adaptive Fanout," Department of Computer Science, National University of Singapore, 2005.

* cited by examiner

FIG. 7A

# ADAPTIVE GOSSIP PROTOCOL

CROSS-REFERENCE TO RELATED APPLICATION

The instant application is a Continuation of, and claims priority to, U.S. Ser. No. 14/805,078 entitled Adaptive Gossip Protocol filed Jul. 21, 2015, the contents of which are expressly incorporated by reference herein in its entirety.

TECHNICAL FIELD

The present technology pertains to synchronizing information and more specifically to synchronizing information in a cluster of nodes using gossip protocol based on an adaptive gossip protocol interval.

BACKGROUND

In a multi-member cluster of nodes, nodes typically synchronize information with each other in order to share updates and events. The gossip protocol is a mechanism often used by nodes to synchronize such information in a cluster. Traditionally, with the gossip protocol, nodes spread information in the cluster by periodically disseminating the information to a peer or node in the cluster. Nodes typically select random peers or nodes and disseminate the information at fixed or static intervals until the information has been synchronized across all nodes in the cluster. However, in many cases, the gossip protocol can be inefficient and often creates unnecessary traffic and overhead. Unfortunately, the conventional gossip protocol is inflexible and generally unable to adapt.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for synchronizing data using adaptive gossiping protocol intervals. The adaptive gossiping protocol intervals can be used when performing gossip protocol communications by nodes in a cluster of nodes. The gossiping protocol can be used by nodes in a cluster to synchronize or communicate various types of data or signals, such as alerts, remote procedure calls (RPCs), logs, requests, queries, configurations, notifications, events, updates, operations, and so forth. For example, the gossiping protocol can be used to synchronize a registry of RPCs across the cluster as well as any updates to the registry.

In some embodiments, a node in a cluster can determine a dynamic gossip interval for disseminating data from the node to the cluster of nodes via a gossip protocol. The dynamic gossip interval can be a dynamic or adaptive interval which can be determined based on one or more factors, such as a synchronization state associated with the cluster, a gossip protocol event associated with the cluster, etc.

Next, the node can gossip the data with one or more nodes in the cluster. For example, the node can select a node from the cluster for gossiping the data to that node and transmit the data to that node based on the gossip protocol. The node can thus identify or select one or more nodes in the cluster for disseminating or gossiping the data to the identified or selected node(s). The identified or selected node(s) can be neighboring nodes or peers in the cluster, for example. In some cases, the node can select the one or more nodes randomly from the cluster or from a subset of nodes. In other cases, the node can select the one or more nodes based on one or more factors or criteria.

The node can then transmit the data to the one or more nodes via the gossip protocol based on the dynamic gossip interval. For example, the node can transmit, relay, or synchronize the data with the one or more nodes at a time defined by the dynamic gossip interval. The node can also transmit the data multiple additional times based on the dynamic gossip interval. For example, the node can transmit the data a first time, wait a period of time defined by the dynamic gossip interval, and transmit the data a second time. The node can continue to transmit data, wait for a period based on the dynamic gossip interval, and transmit the data until the node detects an event or condition, such as an indication that the data has been synchronized to all members or nodes, a termination event, a new update or modification to the data being synchronized, a receipt of new data for synchronization, a new operation or RPC, a predefined state or status, and/or a command, for example.

During subsequent transmissions of data or synchronizations, the node can also further adapt or modify the dynamic gossip intervals based on one or more factors as previously explained. For example, the node can modify the dynamic gossip interval at each synchronization iteration or stage. As another example, the node can maintain the same dynamic gossip interval at one or more iterations or stages and subsequently modify the dynamic gossip interval based on new or updated conditions, circumstances, criteria, events, and/or previously-described factors.

Description

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs). The VTEPs can tunnel the traffic between an underlay network and any overlay network, such as a VXLAN, an NVGRE, or a STT, for example.

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Figure 1:
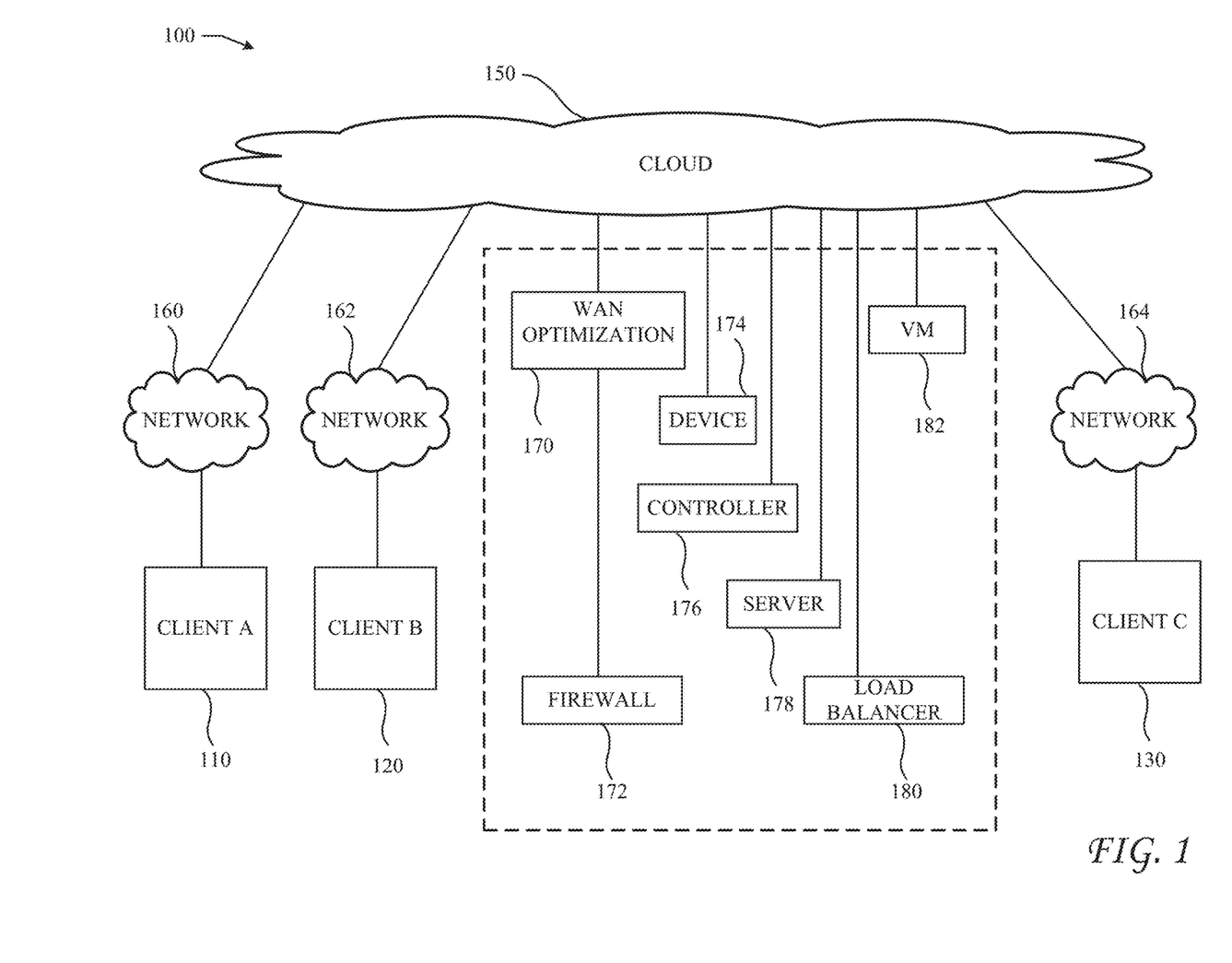
FIG. 1 illustrates a schematic block diagram of an example cloud architecture including nodes/devices interconnected by various methods of communication.
Figure 2A:
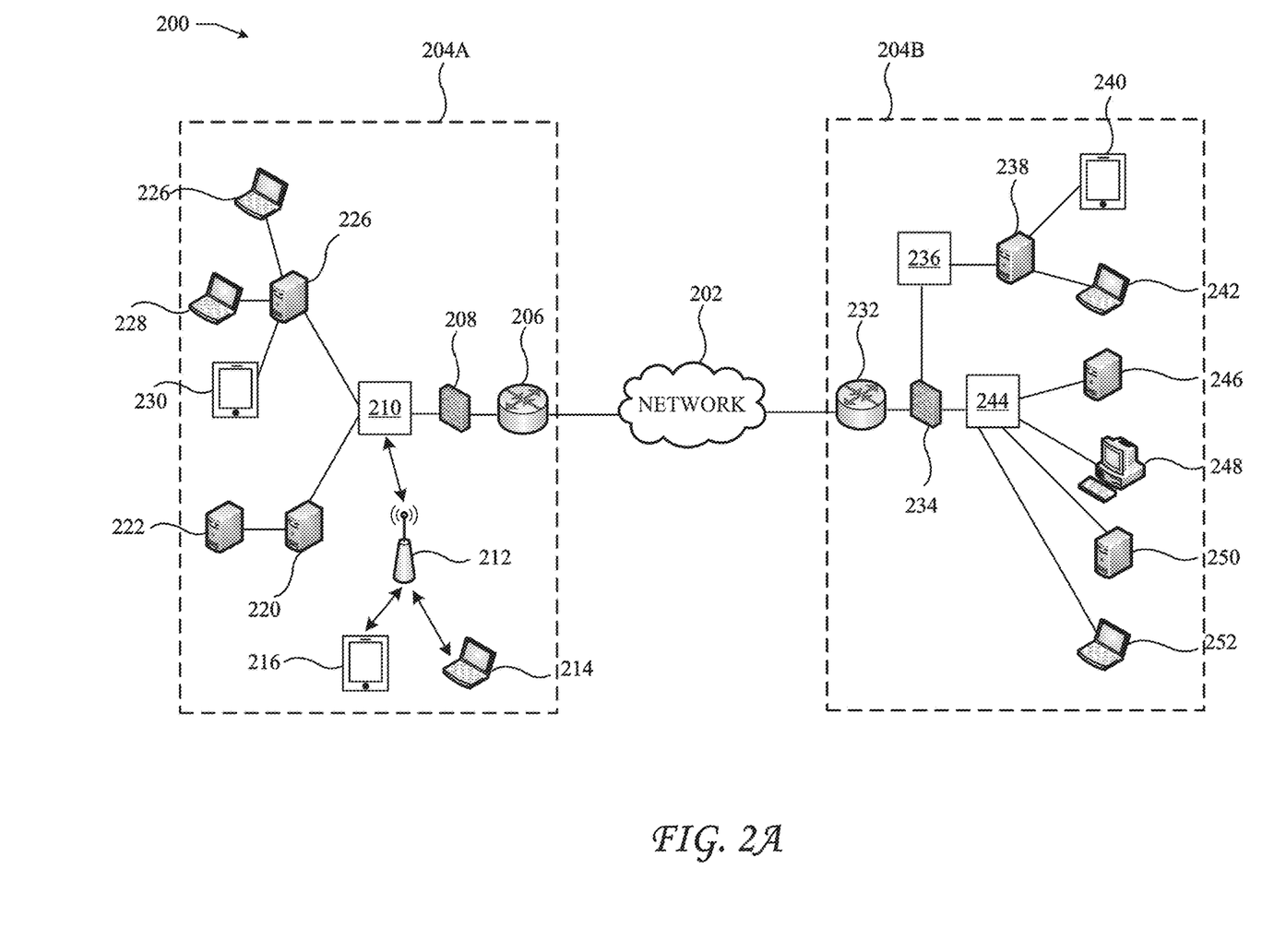
FIG. 2A illustrates a diagram of an example network environment.
Figure 2B:
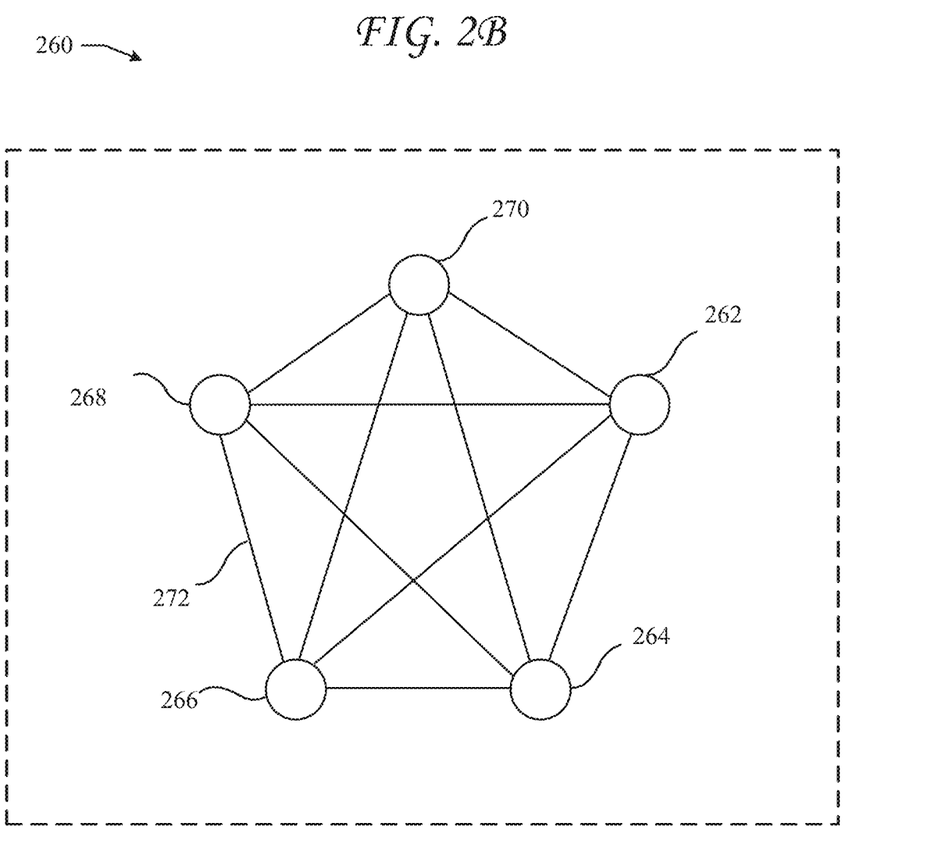
FIG. 2B illustrates a diagram of an example cluster of nodes.
Figure 3:
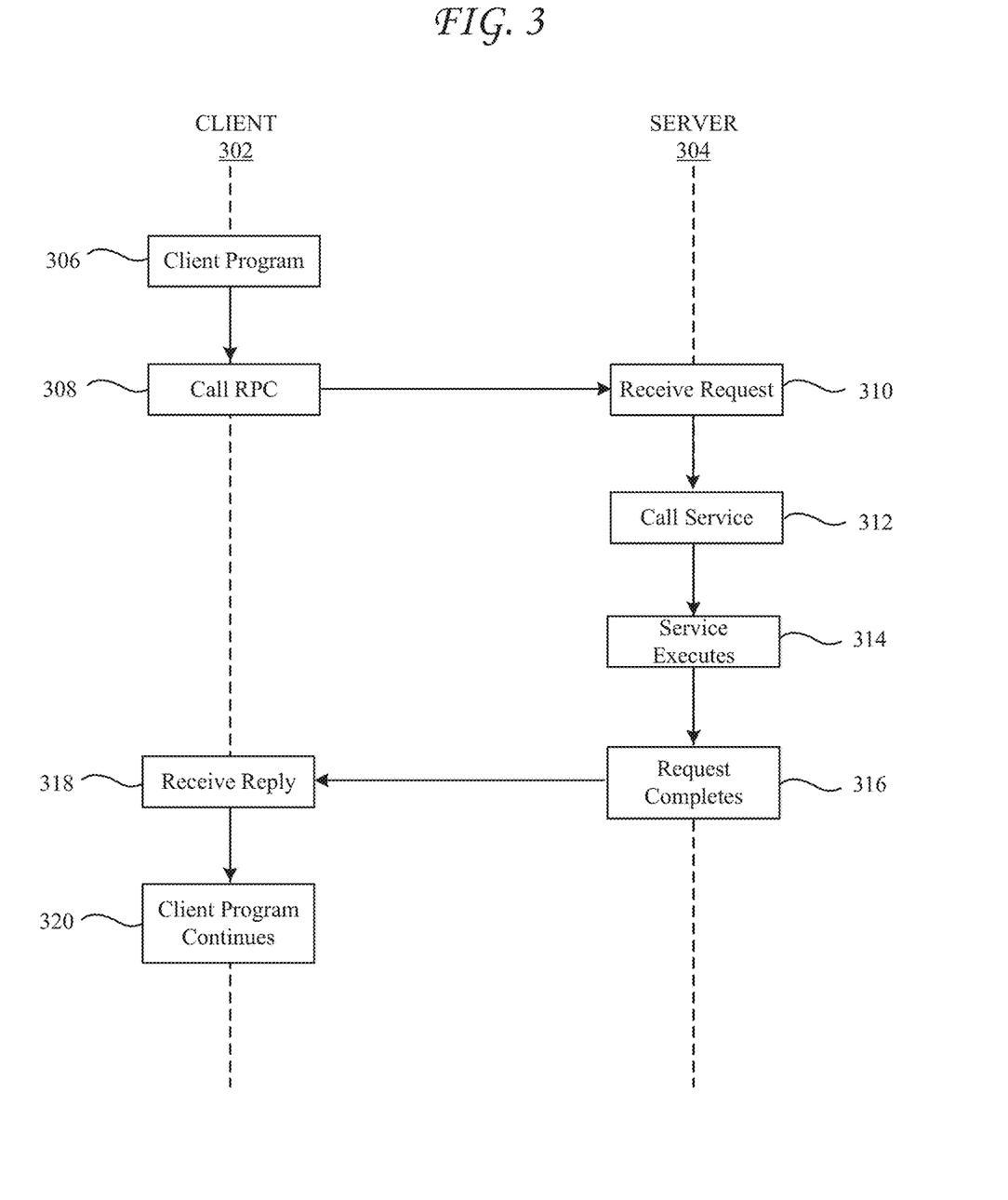
FIG. 3 illustrates a flowchart of an example remote procedure call.
Figure 4A:
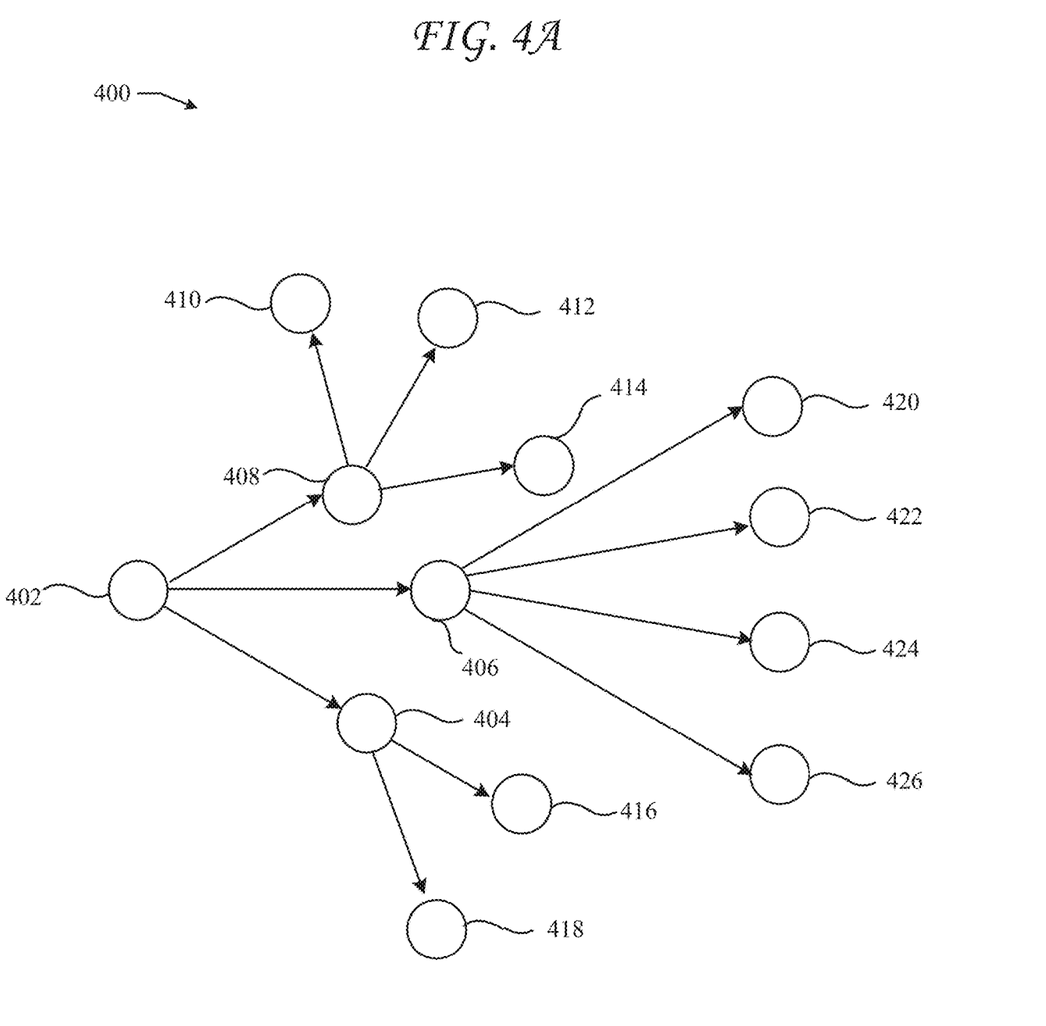
FIG. 4A illustrates a schematic diagram of an example gossip protocol implementation.
Figure 4B:
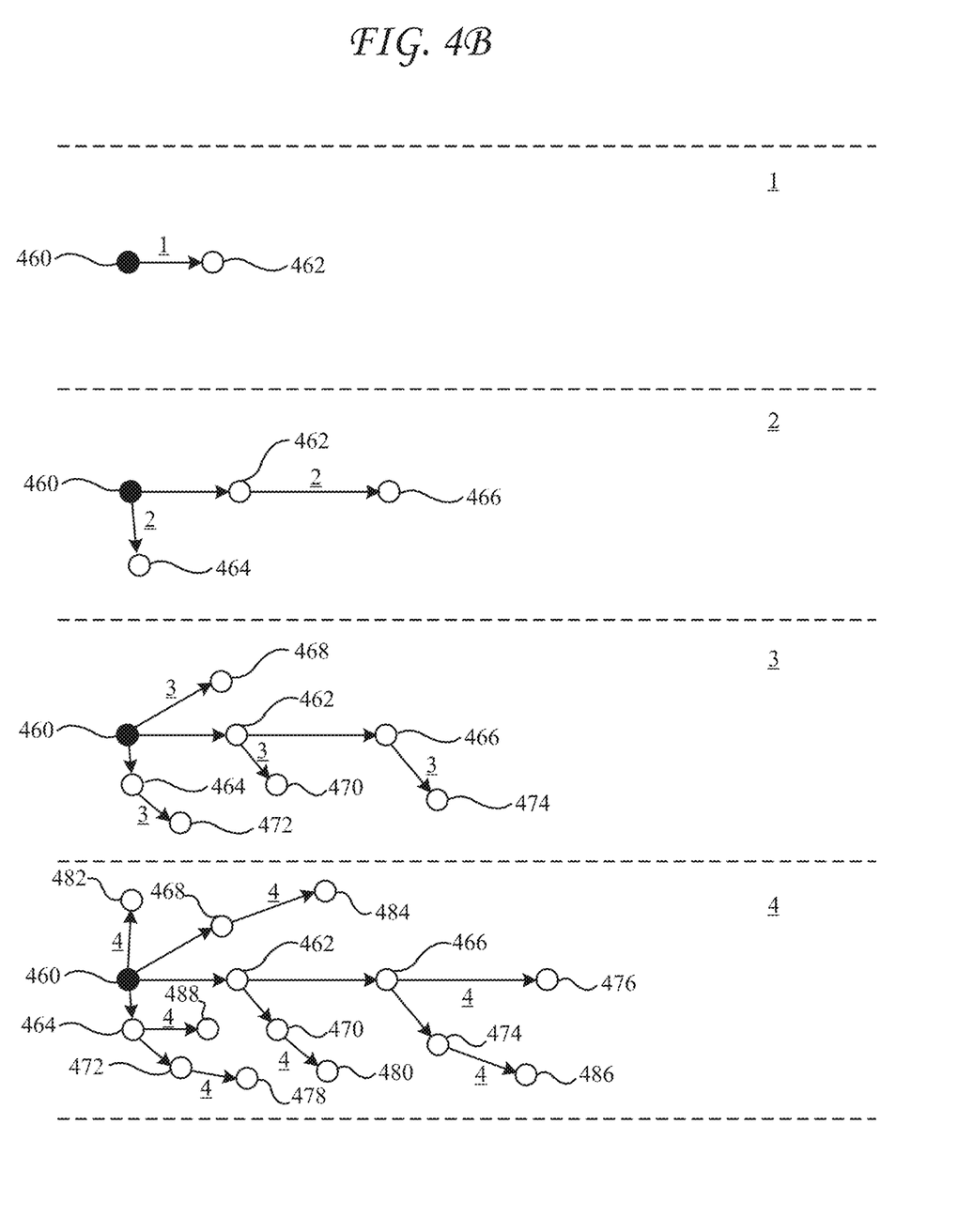
FIG. 4B illustrates a schematic diagram of communication snapshots in an example gossip protocol implementation.
Figure 5:
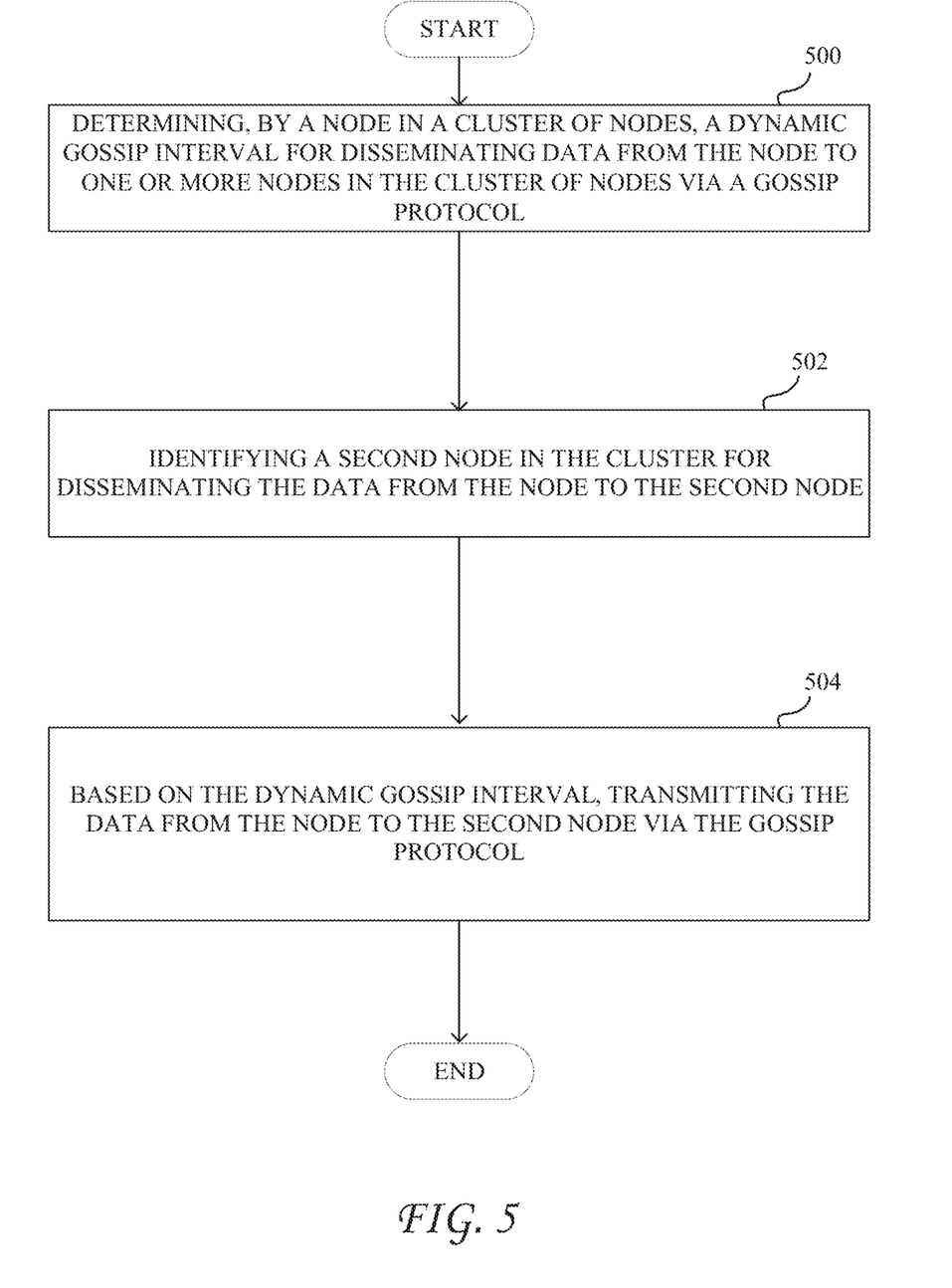
FIG. 5 illustrates an example method embodiment.
Figure 6:
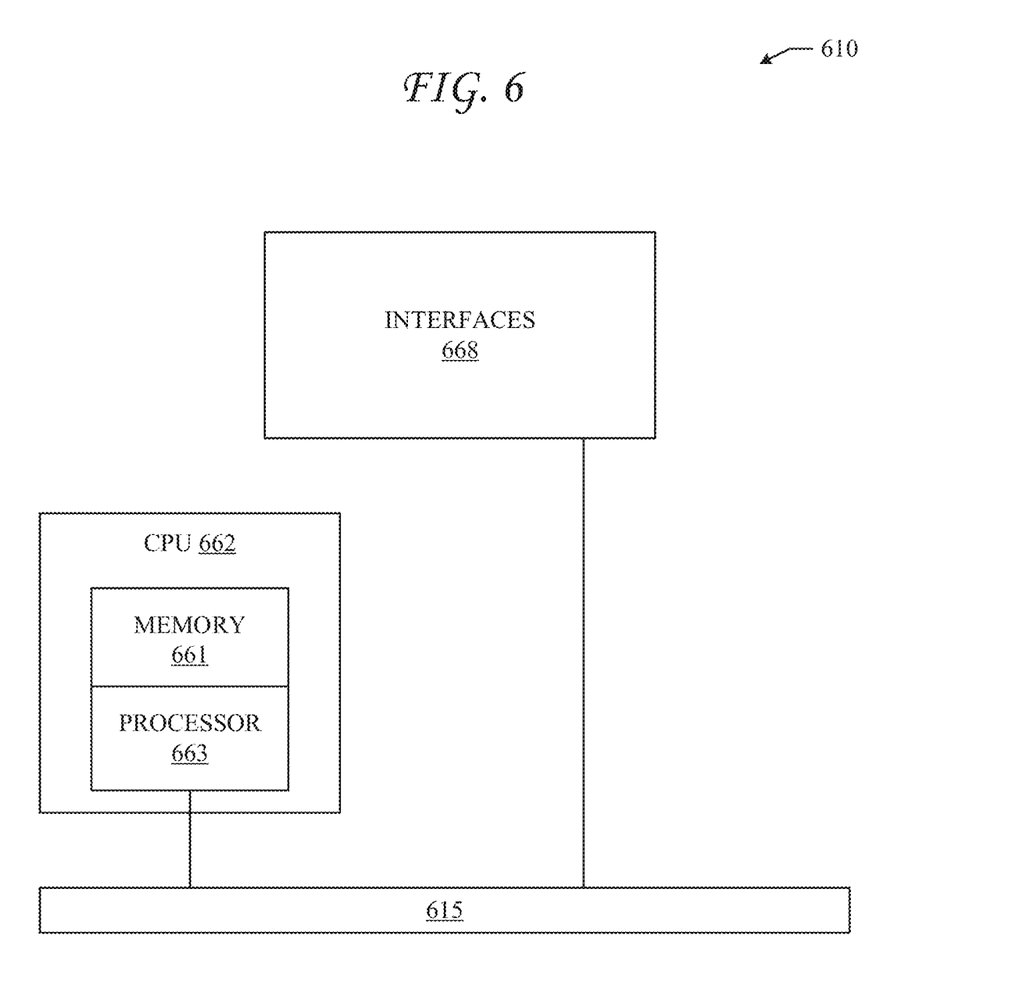
FIG. 6 illustrates an example network device.
Figure 7A:
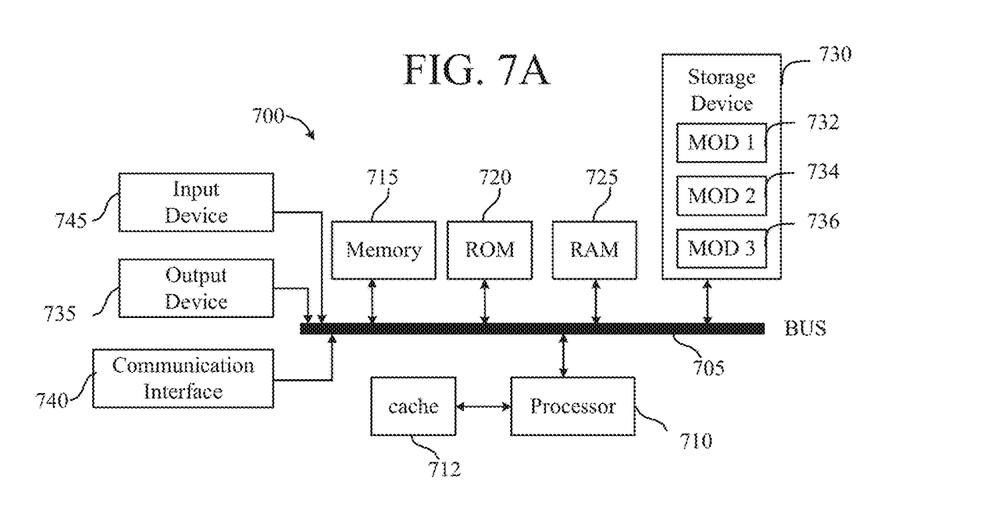
FIG. 7A and FIG. 7B illustrate example system embodiments.
Figure 7B:
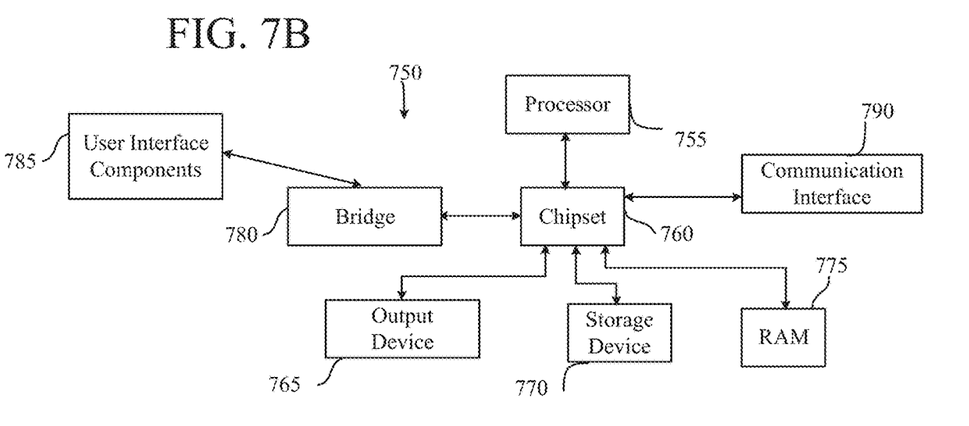

The disclosed technology addresses the need in the art for adaptive gossip protocol intervals. Disclosed are systems, methods, and computer-readable storage media for synchronizing data using adaptive gossiping protocol intervals. A description of network computing environments and architectures, as illustrated in FIGS. 1-2, as well as techniques for remote procedure calls (RPCs), as illustrated in FIG. 3, is first disclosed herein. A discussion of adaptive gossip protocols, as illustrated in FIGS. 4A-B and 5, will then follow. The discussion then concludes with a description of example devices, as illustrated in FIGS. 6 and 7A-B. These variations shall be described herein as the various embodiments are set forth. The disclosure now turns to FIG. 1.

FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers 200, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage network diagnostic tools or graphical user interfaces.

To further illustrate, cloud 150 can provide specific services for client A (110), client B (120), and client C (130). For example, cloud 150 can deploy a network or specific network components, configure links or devices, automate services or functions, or provide any other services for client A (110), client B (120), and client C (130). Other non-limiting example services by cloud 150 can include network administration services, network monitoring services, content filtering services, application control, WAN optimization, firewall services, gateway services, storage services, protocol configuration services, wireless deployment services, and so forth.

To this end, client A (110), client B (120), and client C (130) can connect with cloud 150 through networks 160, 162, and 164, respectively. More specifically, client A (110), client B (120), and client C (130) can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, client A (110), client B (120), and client C (130) can each include one or more networks. For example, (110), client B (120), and client C (130) can each include one or more LANs and VLANs. In some cases, a client can represent one branch network, such as a LAN, or multiple branch networks, such as multiple remote networks. For example, client A (110) can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A (110), client B (120), and client C (130) can each include one or more routers, switches, appliances, client devices, VMs, or any other devices.

Each client can also maintain links between branches. For example, client A can have two branches, and the branches can maintain a link between each other. Thus, in some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as security or VPN services. Cloud 150 can also maintain one or more links or tunnels to client A (110), client B (120), and/or client C (130). For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A (110), client B (120), and client C (130). To this end, client A (110), client B (120), and client C (130) can synchronize information with cloud 150. Cloud 150 can also manage and deploy services for client A (110), client B (120), and client C (130). For example, cloud 150 can collect network information about client A and generate network and device settings to automatically deploy a service for client A. In addition, cloud 150 can update device, network, and service settings for client A (110), client B (120), and client C (130).

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for clarity and simplicity.

Moreover, as far as communications, packets (e.g., traffic and/or messages) can be exchanged among the various nodes and networks in the cloud architecture 100 using specific network protocols. In particular, packets can be exchanged using wired protocols, wireless protocols, security protocols, OSI-Layer specific protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

FIG. 2A illustrates an example network environment 200. The network environment 200 can include one or more networks, such as networks 204A and 204B. Networks 204A and 204B can include one or more local area network (LAN), virtual LANs, wireless networks, physical network segments, logical network segments, underlay networks, overlay networks, etc. Each of the networks 204A and 204B can also include one or more physical and/or logical network segments. For example, networks 204A and 204B can be segmented into VLANs in order to separate traffic within the networks 204A and 204B. Moreover, networks 204A and 204B can be interconnected by network 202. Network 202 can include a private network, such as a LAN, and/or a public network, such as the Internet.

Networks 204A and 204B can include various devices 214-216, 220-222, 226-230, 238-242, 246-252, such as servers and client devices, interconnected via network devices 206-210, 212, 232-236, and 244, such as routers, firewalls, switches, and so forth. Networks 204A and 204B can also include a cluster of nodes. Further, networks 204A and 204B and/or one or more nodes in networks 204A and 204B can be configured to provision network or application services, such as firewall services, content filtering services, application security services, web security services, bandwidth services, VPN services, web services, database services, remote access services, Internet services, and so forth.

The devices 206-216, 220-230, 232-252 and networks 202 and 204A-B in network environment 200 are non-limiting examples of nodes and networks provided for clarity and explanation purposes. One of ordinary skill in the art will readily recognize that network environment 200 can include more or less devices than those depicted in FIG. 2A. Moreover, one of ordinary skill in the art will readily recognize that network environment 200 can include other configurations, architectures, topologies, and so forth. Indeed, other configurations, architectures, topologies, systems, and implementations are contemplated herein.

FIG. 2B illustrates a schematic diagram of an example cluster 260 of nodes. The cluster 260 can include nodes 262-270 within an environment, such as network 200 or cloud 150. The nodes 262-270 can be interconnected by connections 272. In some embodiments, nodes 262-270 in cluster 260 can be interconnected by one or more protocols, networks, media, mechanism, etc. For example, the connections 272 interconnecting nodes 262-270 can be wireless or wired connections established using one or more network protocols, such as transmission control protocol (TCP) or user datagram protocol (UDP), for example.

Moreover, nodes 262-270 in cluster 260 can include one or more client devices, such as laptops or tablet computers; one or more servers, such as application or database servers; one or more network devices, such as routers, switches, hubs, firewalls, or bridges; one or more resources, such as network printers or storage devices; application-based tools or platforms, such as endpoint groups; and/or virtual nodes, such as virtual machines.

In some embodiments, nodes 262-270 can communicate and/or synchronize data and commands, such as remote procedure calls (RPCs), configuration information, logs, registries, statistics, alerts, notifications, messages, settings, files, etc., with each other. For example, in some cases, nodes 262-270 can synchronize a registry of RPC data with each other. Synchronization of data or commands between the nodes 262-270 in the cluster 260 can be performed using broadcast communications, direct communications, or any other specific communication protocol. For example, in some cases, nodes 262-270 can communicate or synchronize data via the gossip protocol, as further explained in FIGS. 4-6.

As one of ordinary skill in the art will readily recognize, the cluster 260 of nodes can include more or less nodes and/or connections in other embodiments. The nodes 262-270 and connections 272 are non-limiting examples provided for explanation purposes.

FIG. 3 illustrates a flowchart of an example remote procedure call (RPC). Client 302 can communicate with server 304 for performing an RPC. In some embodiments, client 302 and server 304 can represent different nodes or computing devices, such as devices 206-216, 220-230, 232-252 in FIG. 2A or nodes 262-270 in FIG. 2B. However, one of ordinary skill in the art will readily recognize that an RPC can be performed from the same computing device or node.

Client 302 can include a client program 306. The client program 306 can make an RPC to server 304. An RPC can be similar to a function call. For example, client program 306 can call remote procedures or procedures that do not exist in the same address space as the calling procedure. RPC can thus be implemented to construct distributed, client-server based applications.

Client program 306 can make a call procedure 308 that sends a request to server 304 and waits for a reply or response. In some cases, the thread in the client 302 can be blocked from processing until a reply is received or a timeout is detected.

Server 304 can receive 310 the call procedure and call 312 a dispatch routine that executes 314 the requested service. Server 304 then completes 316 the request and transmits a reply.

Client 302 (e.g., client program 306) then receives 318 the reply and the client program 306 can continue.

FIG. 4A illustrates a schematic diagram 400 of an example gossip protocol implementation. Gossip protocol can be used by nodes or devices to communicate information in a network and/or distributed environment, such as cloud 150 or environment 200. For example, node 402 can determine that it needs to disseminate a message to nodes 404-426, and select nodes 404-408 to communicate the message to nodes 404-408. In some embodiments, node 402 can select nodes 404-408 randomly. In other cases, node 402 can select one or more predetermined neighbors or nodes.

Nodes 404-408 can receive the message from node 402 and subsequently select nodes 410-426 to further communicate the message to nodes 410-426. For example, node 404 can select nodes 416, 418, node 406 can select nodes 420-426, and node 408 can select nodes 410-414. Subsequently, nodes 404-408 can communicate the message to their respectively selected nodes from nodes 410-426. Thus, each node receives the message from node 402 and subsequently selects one or more nodes and forwards or transmits the message to the selected nodes. The gossip protocol can thus ensure that the specific message is efficiently disseminated to all nodes.

In some embodiments, the gossip protocol can be analogized to a spreading of a rumor in an office. For example, Bob and Lisa congregate around the water cooler and Bob tells Lisa a rumor. Later, Lisa congregates around the water cooler with Mary and tells Mary the rumor from Bob. Mary later runs into John and David in the break room, and tells John and David the rumor from Bob. In this way, the number of individuals who have heard the rumor from Bob keeps increasing.

Similarly, nodes 402-426 can spread or disseminate information in a similar fashion to individuals spreading rumors. Nodes 402-426 can perform peer selection to identify peers or nodes to communicate the information to with a given frequency. Traditionally, the given frequency for transmitting information by nodes is based on a fixed or static interval defined for the specific gossip protocol implementation. By contrast, in some aspects herein, the gossip protocol interval used by one or more nodes can by dynamic, adaptive, flexible, and/or modified. For example, nodes 402-426 can adjust the interval based on one or more factors, such as a context, current circumstances, received communications or messages, detected events, the type of information being communicated, a characteristic of the communication or network, a state or status of one or more nodes, a frequency of gossip protocol communications received by one or more nodes, message overhead, synchronization state, specific requirements or criteria defined for the information or event associated with the gossip protocol communication, etc.

In some embodiments, nodes 402-426 can adjust the interval to optimize efficiency, minimize network load or overhead, reduce unnecessary communications, increase the dissemination time of the information, etc. For example, nodes 402-426 can increase or decrease the time interval for gossip protocol communications. Nodes 402-426 can track or monitor conditions, circumstances, statistics, state information, synchronization status, etc., to determine how or if a criteria or parameter (e.g., efficiency, performance, network load, overhead, convergence, reduction of unnecessary communications, etc.) can be optimized by increasing or decreasing the time interval.

For example, nodes 402-426 can track changes, notifications, or communications from each other to determine whether to increase or decrease the time interval. In some cases, as the frequency of changes, notifications, or communications received by a node from member nodes increases, the node can decrease the time interval to increase the speed and/or frequency in which it disseminates information so as to optimize convergence of information being disseminated. On the other hand, as the frequency of changes, notifications, or communications received by a node from member nodes decreases, the node can increase the time interval to decrease the speed and/or frequency in which it disseminates information so as to minimize unnecessary communications.

In some cases, nodes 402-426 can also track or monitor the convergence or synchronization status of the information being disseminated via the gossip protocol. For example, if a node detects that the information is synchronized across all member nodes, it can increase the time interval so as to limit subsequent communications. This way, a node can limit or minimize communications of the information that has already been synchronized.

The information synchronized or transmitted via the gossip protocol can vary in different embodiments. For example, the information can include state information, notifications or alerts, settings, events, RPCs, logged information, statistics, queries, commands, stored data, etc. In some embodiments, nodes 402-426 can maintain a registry of RPCs invoked by members and communicate changes to the registry via the gossip protocol using an adaptive gossip interval which can be increased or decreased based on one or more of the factors previously described. In some cases, such registry can also include other information, such as information about each RPC invoked or detected, as well as an indication of which node(s) can handle such RPC. Thus, nodes 402-426 can maintain a registry which identifies what RPCs have been invoked, which nodes have invoked such RPCs, and/or which nodes can handle the RPCs.

Nodes 402-426 can select one or more peers or nodes for transmitting information under the gossip protocol. In some embodiments, peers or nodes can be selected randomly. In other embodiments, peers or nodes can be predefined or preselected based on one or more criteria or conditions. In yet other embodiments, peers or nodes can be selected by each node based on one or more factors or characteristics, such as adjacency, cost, status, synchronization state, distance, availability, statistics, etc.

FIG. 4B illustrates a schematic diagram of communication snapshots in an example gossip protocol implementation. The communication snapshots 1-4 can depict the dissemination of information from nodes 460-488 at various stages, points, intervals, periods, etc., using the gossip protocol. Nodes 460-48 can be any node or device in a network, environment, and/or cluster, such as cloud 150, environment 200, or cluster 260.

At snapshot 1, node 460 can transmit information to node 462.

At snapshot 2, node 460 can transmit the information to node 464, and node 462 can transmit the information to node 466.

At snapshot 3, node 460 can transmit the information to node 468. Node 462 can transmit the information to node 470. Node 464 can transmit the information to node 472. Also, node 466 can transmit the information to node 474.

At snapshot 4, node 460 can transmit the information to node 482. Node 464 can transmit the information to node 488. Node 472 can transmit the information to node 478. Node 468 can transmit the information to node 484. Node 470 can transmit the information to node 480. Node 466 can transmit the information to node 476, and node 474 can transmit the information to node 486.

As illustrated in FIG. 4B, each node can receive the information and relay it to a different node. After receiving the information, a node can, at each snapshot, relay the information to a different node. However, in some embodiments, one or more nodes may not relay any information at one or more snapshots. In other words, one or more nodes may skip relaying information at one or more snapshots. Moreover, while none of the nodes are shown as relaying the information to a node that has previously received the information, one of ordinary skill in the art will readily recognize that in some cases, a node may relay the information to another node that has already received the information. Further, while each node is shown as relaying the information to one other node and each node is shown is receiving the information from only one node, one of ordinary skill in the art will readily recognize that in other cases a node can relay the information to multiple nodes and/or a node can receive the information from multiple nodes. The nodes and snapshots in FIG. 4B are non-limiting examples provided for explanation purposes.

In some cases, the interval for relaying the information by the nodes at each snapshot 1-4 can vary based on one or more factors as previously described. For example, at snapshot 2 node 462 may relay the information at a time interval of 2 ms, and later modify the time interval at snapshot 3 to 3 ms when relaying the information.

Furthermore, in some cases, the information relayed by the nodes 460-488 can include a registry of RPC information, such as RPC invocations, RPC assignments, RPC completions, RPC and node associations, indications of which nodes may be able to handle which RPCs, etc. For example, snapshots 1-4 can represent the dissemination of a modification to an RPC registry to update all of the nodes 460-488 with the new RPC registry (e.g., the RPC registry with the modification). Additional changes to the RPC registry can then trigger the additional changes and/or the new or updated RPC registry to again be synchronized or relayed to the nodes 460-488. The nodes 460-488 can thus use the gossip protocol in this way to synchronize or relay the RPC registry and any changes or updates to the RPC registry.

Having disclosed some basic system components and concepts, the disclosure now turns to the example method embodiment shown in FIG. 5. For the sake of clarity, the method is described in terms of node 402, as shown in FIG. 4A, configured to practice the method. The steps outlined herein are exemplary and can be implemented in any combination thereof, including combinations that exclude, add, or modify certain steps.

Node 402 can be a node from multiple nodes in a cluster, such as cluster 260. At step 500, node 402 can determine a dynamic gossip interval for disseminating data from the node 402 to the cluster of nodes via a gossip protocol. The dynamic gossip interval can be a dynamic or adaptive interval which can be determined based on one or more factors. Non-limiting examples of factors which can be used to modify and/or determine a gossip protocol interval can include a synchronization state associated with the cluster of nodes, a gossip protocol event associated with the cluster of nodes (e.g., a gossip protocol message or communication, a gossip protocol synchronization statistic, etc.), one or more updates to information maintained by nodes or synchronized via the gossip protocol, a frequency of communications or synchronizations between the nodes, content modifications, one or more RPCs (e.g., RPC call 308), updates to a synchronized data structure or object (e.g., RPC registry, data table, etc.), etc.

In some cases, the node 402 can determine the dynamic gossip interval in response to a trigger or event, such as a synchronization event (e.g., a receipt of data synchronized from another member, an update or change from another member, a request or call from another member, a determination that node 402 has data to be synchronized or relayed, etc.), an invocation of an RPC by the node 402 or another member, an operation by node 402 or another member, a status of node 402 or another member, a synchronization state (e.g., whether data maintained by members or nodes in a cluster has been fully synchronized, whether members or nodes in the cluster are in synchronizing mode, etc.), and so forth.

At step 502, node 402 can identify one or more nodes in the cluster for disseminating the data from the node 402 to the one or more nodes. The one or more nodes can be neighboring nodes or peers in the cluster, for example. In some cases, the node 402 can select the one or more nodes randomly from the cluster or from a subset of nodes. For example, the node 402 can select four nodes randomly from a subset of 20 nodes identified based on previous communications, synchronizations, or events. To illustrate, node 402 can identify all members or nodes in the cluster and exclude those nodes or members that have already received the information from node 402, and select randomly the one or more nodes from the remaining subset of nodes.

In other cases, the node 402 can select the one or more nodes based on one or more factors or criteria. For example, node 402 can select the one or more nodes based on a cost, distance, adjacency, status, history, etc.

At step 504, node 402 can transmit the data to the one or more nodes via the gossip protocol based on the dynamic gossip interval. For example, node 402 can transmit, relay, or synchronize the data with the one or more nodes at a time defined by the dynamic gossip interval. The node 402 can also transmit the data multiple additional times based on the dynamic gossip interval. For example, the node 402 can transmit the data a first time, wait a period of time defined by the dynamic gossip interval, and transmit the data a second time. The node 402 can continue to transmit data, wait for a period based on the dynamic gossip interval, and transmit the data until the node 402 detects an event or condition, such as an indication that the data has been synchronized to all members or nodes, a termination event, a new update or modification to the data being synchronized, a receipt of new data for synchronization, a new operation or RPC, a predefined state or status, and/or a command, for example.

During subsequent transmissions of data or synchronizations, the node 402 can also further adapt or modify the dynamic gossip intervals based on one or more factors as previously explained. For example, the node 402 can modify the dynamic gossip interval at each synchronization iteration or stage. As another example, the node 402 can maintain the same dynamic gossip interval at one or more iterations or stages and subsequently modify the dynamic gossip interval based on new or updated conditions, circumstances, criteria, events, and/or previously-described factors.

In some embodiments, the dynamic gossip interval can be an adaptive interval for synchronizing an RPC registry maintained by nodes in a cluster or network, such as cloud 150, environment 200, and/or cluster 260. The RPC registry can maintain all RPCs along with an indication of which member(s) or node(s) can handle each RPC. The RPC registry can also be maintained on each member or node in the cluster or network. However, in some embodiments, the RPC registry can be maintained by a subset of all members or nodes in the cluster or network. The RPC registry can be synchronized across all members or nodes using the gossip protocol and the dynamic or adaptive interval. The RPC registry can be used to determine which member or node to handle any particular RPC from another member or node. Since different members or nodes can handle different RPCs, the RPC registry can allow clients to be agnostic to which members or nodes can handle an RPC so that any RPC can be invoked from any member. Moreover, when a client invokes an RPC, a node, such as a controller or another member, can use the synchronized RPC registry to determine which member can handle the RPC and appropriately route the request to the specific member.

The gossip protocol and adaptive interval can also be implemented to synchronize other information and maintain distributed data synchronized between members or nodes in a cluster or network. For example, the gossip protocol and adaptive interval can be used to synchronize alerts, notifications, queries, commands, stored data, settings, logs, routing information, messages, status information, configuration data, etc. The adaptive or dynamic interval can allow for the gossip protocol to be used to synchronize the information between members or nodes in an optimized manner which can vary the frequency of synchronization intelligently for improved efficiency, reduced network load or overhead, reduced redundancy in messaging and communications, scalability, and so forth.

Example Devices

FIG. 6 illustrates an example network device 610 suitable for routing, switching, forwarding, traffic management, and load balancing. Network device 610 can be, for example, a router, a switch, a controller, a server, a gateway, and/or any other L2 and/or L3 device.

Network device 610 can include a master central processing unit (CPU) 662, interfaces 668, and a bus 615 (e.g., a PCI bus). When acting under the control of appropriate software or firmware, the CPU 662 is responsible for executing packet management, error detection, load balancing operations, and/or routing functions. The CPU 662 can accomplish all these functions under the control of software including an operating system and any appropriate applications software. CPU 662 may include one or more processors 663, such as a processor from the Motorola family of microprocessors or the MIPS family of microprocessors. In an alternative embodiment, processor 663 is specially designed hardware for controlling the operations of network device 610. In a specific embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the network device 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output device 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim. Further, features described with reference to an embodiment disclosed herein can be combined with, or implemented in, any other embodiments disclosed herein.

We claim:

1. A method comprising:
    determining, by a first node in a cluster of nodes, a dynamic gossip interval for disseminating data from the first node to one or more nodes in the cluster of nodes via a gossip protocol, the dynamic gossip interval being based on at least one of a synchronization state associated with the cluster of nodes and one or more gossip protocol events associated with the cluster of nodes, wherein the synchronization state comprises at least one of a number of nodes in the cluster that have not received the data and a frequency interval between one or more first gossip protocol communications and one or more second gossip protocol communications received by the first node from one or more nodes in the cluster;
    identifying a second node in the cluster for disseminating the data from the first node to the second node;
    transmitting the data from the first node to the second node via the gossip protocol at a time determined based on the dynamic gossip interval; and
    increasing the dynamic gossip interval in response to at least one of a decrease in the number of nodes in the cluster that have not received the data and a decrease in the frequency interval between the one or more first gossip protocol communications and the one or more second gossip protocol communications received by the first node from the one or more nodes in the cluster.

2. The method of claim 1, further comprising, after a period of time determined based on the dynamic gossip interval, transmitting the data to a third node in the cluster.

3. The method of claim 1, further comprising:
transmitting the data to a third node in the cluster after a period of time determined based on the increased dynamic gossip interval.

4. The method of claim 1, wherein the second node comprises a neighboring peer in the cluster of nodes.

5. The method of claim 1, wherein identifying the second node comprises selecting the second node randomly from the cluster of nodes.

6. The method of claim 1, wherein the one or more gossip protocol events associated with the cluster of nodes comprise at least one of a data synchronization event and a synchronization triggering event.

7. The method of claim 1, wherein the data comprises a registry of remote procedure calls associated with the cluster of nodes.

8. A non-transitory computer-readable storage media having stored therein instructions which, when executed by one or more processors, cause the one or more processors to:
determine, by a first node in a cluster of nodes comprising a plurality of nodes, a dynamic gossip interval for disseminating data from the first node to one or more nodes in the cluster of nodes via a gossip protocol, the dynamic gossip interval being based on at least one of a synchronization state associated with the cluster of nodes and one or more gossip protocol events associated with the cluster of nodes, wherein the synchronization state comprises at least one of a number of nodes in the cluster that have not received the data and a frequency interval between one or more first gossip protocol communications and one or more second gossip protocol communications received by the first node from one or more nodes in the cluster;
identify a second node in the cluster for disseminating the data from the first node to the second node;
transmit the data from the first node to the second node via the gossip protocol at a time determined based on the dynamic gossip interval; and
increase the dynamic gossip interval in response to at least one of a decrease in the number of nodes in the cluster that have not received the data and a decrease in the frequency interval between the one or more first gossip protocol communications and the one or more second gossip protocol communications received by the first node from the one or more nodes in the cluster.

9. The non-transitory computer-readable storage media of claim 8, wherein the instructions, when executed by the one or more processors, cause the one or more processors to transmit, after a period of time determined based on the dynamic gossip interval, the data to a third node in the cluster.

10. The non-transitory computer-readable storage media of claim 8, wherein the instructions, when executed by the one or more processors, cause the one or more processors to:
transmit the data to a third node in the cluster after a period of time determined based on the increased dynamic gossip interval.

11. The non-transitory computer-readable storage media of claim 8, wherein the second node comprises a neighboring peer in the cluster of nodes.

12. The non-transitory computer-readable storage media of claim 8, wherein identifying the second node comprises selecting the second node randomly from the plurality of nodes.

13. The non-transitory computer-readable storage media of claim 8, wherein the one or more gossip protocol events associated with the cluster of nodes comprise at least one of a data synchronization event and a synchronization triggering event.

14. The non-transitory computer-readable storage media of claim 8, wherein the data comprises a registry of remote procedure calls associated with the cluster of nodes.

15. A system comprising:
one or more processors; and
a non-transitory computer-readable storage medium having stored therein instructions which, when executed by the one or more processors, cause the one or more processors to:
determine, by a first node in a cluster of nodes comprising a plurality of nodes, a dynamic gossip interval for disseminating data from the first node to one or more nodes in the cluster of nodes via a gossip protocol, the dynamic gossip interval being based on at least one of a synchronization state associated with the cluster of nodes and one or more gossip protocol events associated with the cluster of nodes;
identify a second node in the cluster for disseminating the data from the first node to the second node;
transmit the data from the first node to the second node via the gossip protocol at a time determined based on the dynamic gossip interval; and
increase the dynamic gossip interval in response to at least one of a decrease in a number of nodes in the cluster that have not received the data and a decrease in a frequency interval between one or more first gossip protocol communications and one or more second gossip protocol communications received by the first node from the one or more nodes in the cluster.

16. The system of claim 15, wherein the instructions, when executed by the one or more processors, cause the one or more processors to transmit, after a period of time determined based on the dynamic gossip interval, the data to a third node in the cluster.

17. The system of claim 15, wherein the instructions, when executed by the one or more processors, cause the one or more processors to:
transmit the data to a third node in the cluster after a period of time determined based on the increased dynamic gossip interval.

18. The system of claim 15, wherein the second node comprises a neighboring peer in the cluster of nodes.

19. The system of claim 15, wherein identifying the second node comprises selecting the second node randomly from the plurality of nodes.

20. The system of claim 15, wherein the synchronization state associated with the cluster of nodes corresponds to a number of nodes that have received the data through a synchronization event, and wherein the one or more gossip protocol events associated with the cluster of nodes comprise at least one of a data synchronization event and a synchronization triggering event.

* * * * *